United States Patent
Marquis et al.

[11] Patent Number: 6,113,485
[45] Date of Patent: Sep. 5, 2000

[54] DUCT PROCESSOR COOLING FOR PERSONAL COMPUTER

[75] Inventors: Terrance M. Marquis, Austin; Raymond S. Duley, Buda, both of Tex.

[73] Assignee: Advanced Micro Devices, Inc., Sunnyvale, Calif.

[21] Appl. No.: 08/999,807

[22] Filed: Nov. 26, 1997

[51] Int. Cl.[7] ................................. H05K 7/20
[52] U.S. Cl. .................... 454/184; 165/80.3; 165/121; 361/697
[58] Field of Search ................. 165/80.37, 121; 361/697; 181/224; 454/184

[56] References Cited

U.S. PATENT DOCUMENTS

| | | | |
|---|---|---|---|
| 1,033,963 | 7/1912 | Surprise | 181/224 |
| 2,853,147 | 9/1958 | D'Eustachio | 181/224 |
| 3,125,286 | 3/1964 | Sanders | 181/224 |
| 4,699,208 | 10/1987 | Wolf et al. | 165/41 |
| 5,019,880 | 5/1991 | Higgins, III | 165/80.3 X |
| 5,497,825 | 3/1996 | Yu | 165/11.1 |
| 5,597,035 | 1/1997 | Smith et al. | 165/80.3 |
| 5,763,950 | 6/1998 | Fujisaki et al. | 257/712 |

FOREIGN PATENT DOCUMENTS

| | | | |
|---|---|---|---|
| 2585918 | 7/1985 | France | 165/80.3 |

*Primary Examiner*—Allen Flanigan
*Attorney, Agent, or Firm*—Kevin L. Daffer; Conley, Rose & Tayon

[57] ABSTRACT

A system for the cooling of integrated circuits and, more particularly, for the use of cooling ducts alone or in combination with cooling fans to lower the temperature of integrated circuits. The cooling duct substantially surrounds the integrated circuit. Cooling air may be convectively conducted through the duct to the integrated circuit. Alternatively the cooling air is preferably conducted through the duct to the integrated circuit by at least one cooling fan. Additional cooling fans may be placed within the duct or on the exterior of the duct. The duct may extend through the computer case, communicating with air outside the case. Alternatively, the fans may blow the heated air from the duct outside of the computer case.

11 Claims, 9 Drawing Sheets

DUCT PROCESSOR COOLING FOR PERSONAL COMPUTER

BACKGROUND OF THE INVENTION

1. Field of the Invention

This invention relates to cooling of integrated circuits and, more particularly, to the use of cooling ducts alone or in combination with cooling fans to lower the temperature of integrated circuits.

2. Description of the Relevant Art

The reliability of electronic equipment has typically been associated with the operating temperatures of its components. In general, the higher the temperature the less reliable the component. With the continuing emphasis on miniaturization and enhanced performance of electronic devices, the density of electronic components per unit volume, and hence the power density, are steadily increasing. This tends to cause elevated temperatures due to heat dissipation problems. Since the elevated temperatures lower the performance of integrated circuits, there is a need for effective cooling devices.

The operating speed of an integrated circuit tends to be dependent on its temperature. As the temperature increases the effective operating speed of the integrated circuit is lowered. The operating temperature of an integrated circuit in a computer system is typical influenced by the operating speed, the voltage usage and the temperature of the interior of the case. Assuming no changes are made to the operating voltage of the integrated circuit, a process which lowers the temperature of an integrated circuit and/or the temperature of the case may allow optimal performance to be obtained for that integrated circuit.

Various heat dissipating apparatus, including fans, thermal control circuits, heat sinks, cooling couplers, etc. have been developed and extensively used in computer systems. The most commonly used of these devices is the cooling fan. Cooling fans are typically used to create an air flow through the computer case. Despite the presence of a cooling air stream the temperature within the computer case or chassis still tends to rise. The temperature rise may be caused, in part, by the insufficient volume of cooling air flowing through the computer case. Under typical usage, the interior of a computer case may extend upwards of 40° C., for example.

One cooling system involves blowing heated air away from the hottest integrated circuits. As an integrated circuit becomes hotter the air in the immediate vicinity becomes warm. A fan is typically mounted onto the integrated circuit and is used to blow the heated air away from the component, thereby lowering the temperature of the component. The air leaves the vicinity of the integrated circuit and is circulated throughout the computer case. Heated air within the computer case tends to cause the temperature of the other components to rise. Typically, the highest temperature components, such as central processing units, are cooled in this manner.

Other cooling systems tend to use a combination of direct component cooling along with an external air stream passing through the computer. In this type of system the integrated circuit is cooled by directly blowing the heated air from the integrated circuit into an air stream. By placing one fan on the integrated circuit and the another fan near the integrated circuit, the dissipated heat may be more efficiently removed.

Additionally, a heat sink, typically composed of a series of metal fins, may be attached to a high temperature integrated circuit to aid in cooling. Cooler air may be drawn across the heat sink by fans mounted on the walls of the case or on top of the heat sink. Such a system tends to cool a component by allowing the heat sink to draw the heat away from the component. The cooling air removes the heat from the heat sink and the hot air is blown outside the computer case.

Such a system, however, is insufficient to remove all of the heat from the case. The heat sink is typically placed next to the fan blowing air out of the case. Since the air typically enters the case from a side opposite the fan, the air is usually heated to a slightly higher temperature by other components within the system before reaching the heat sink. This lowers the efficiency of cooling such that the integrated circuit may not get an appropriate amount of cooling. Since the integrated circuit may not be totally cooled, the excess heat is typically dissipated throughout the case causing the temperature of the case to rise. In such systems the temperature of the case may be up to 10° C. higher than the outside air.

It is therefore desirable to devise a cooling system that will cool the hottest components without the heat being dissipated to the other components. This should reduce the temperature of the computer case, since there will be less heat generated within the case. Additionally, the cooling system should transfer the cooler air to the component to be cooled without the air being heated by other components before reaching the component of interest.

SUMMARY OF THE INVENTION

The problems outlined above are in large part solved by the use of air cooling ducts alone or in combination with cooling fans to lower the temperature of integrated circuits specifically, and the interior of the computer casing in general.

According to an embodiment of the present invention, a duct for transferring cool air to an integrated circuit mounted on a circuit board surrounds the integrated circuit. A heat sink is preferably attached to the outer surface of the integrated circuit. The heat sink preferably helps transfer the heat generated by the integrated circuit to the surroundings. The duct is positioned such that the integrated circuit and the heat sink are surrounded by the duct. The duct may form a seal around the integrated circuit. The duct includes an opening at an end of the duct. The end of the duct is preferably positioned proximate the bottom portion of the computer case, such that the air at the bottom of the case may be convectively drawn through the opening, into the duct, and across the heat sink.

In another embodiment, a duct for transferring cool air to an integrated circuit mounted on a circuit board may include two openings positioned at opposite ends of the duct. One end of the duct is preferably positioned proximate the bottom portion of the computer case, such that the air at the bottom of the case may be convectively drawn through the opening at this end, into the duct, and across the heat sink. The other end of the duct is preferably positioned through a wall of the computer case. The other end is preferably located at a position substantially above the integrated circuit to be cooled. The opening at this other end preferably communicates with the air outside the computer case. This opening may allow air to be convectively drawn across the heat sink and out the top of the computer case.

In another embodiment, the duct may include two openings positioned at opposite ends of the duct. Both ends of the duct are preferably positioned through a wall of the computer case. One end is preferably located at a position substantially below the integrated circuit being cooled. The other end is preferably located at a position substantially above the integrated circuit to be cooled, communicating with the air outside the computer case. Air may then be drawn from outside the computer case, across the heat sink, and out of the top of the computer case.

Cooling fans may be placed at a variety of positions on the interior and exterior of the duct. Additionally fans may be placed on the heat sink or the integrated component. Fans may be used to increase the velocity of the cooling air traveling through the ducts, thereby increasing the rate of cooling, and lowering the average temperature of a component.

The duct is preferably made of a substantially flexible plastic material. When a fan is positioned within the duct acoustical vibrations from the fan may be transferred from the fan to the integrated circuit. The duct is preferably made from an acoustical dampening material to minimize the acoustical vibrations transferred to the integrated circuit. Additionally, the duct may include noise baffles located in the interior of the duct which may dampen the acoustical vibrations produced by a fan.

An advantage of the present invention is that the duct allows cool air to be directed to the integrated circuit.

Another advantage of the present invention is that the integrated circuit is isolated from the rest of the components.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figures 1, 3:
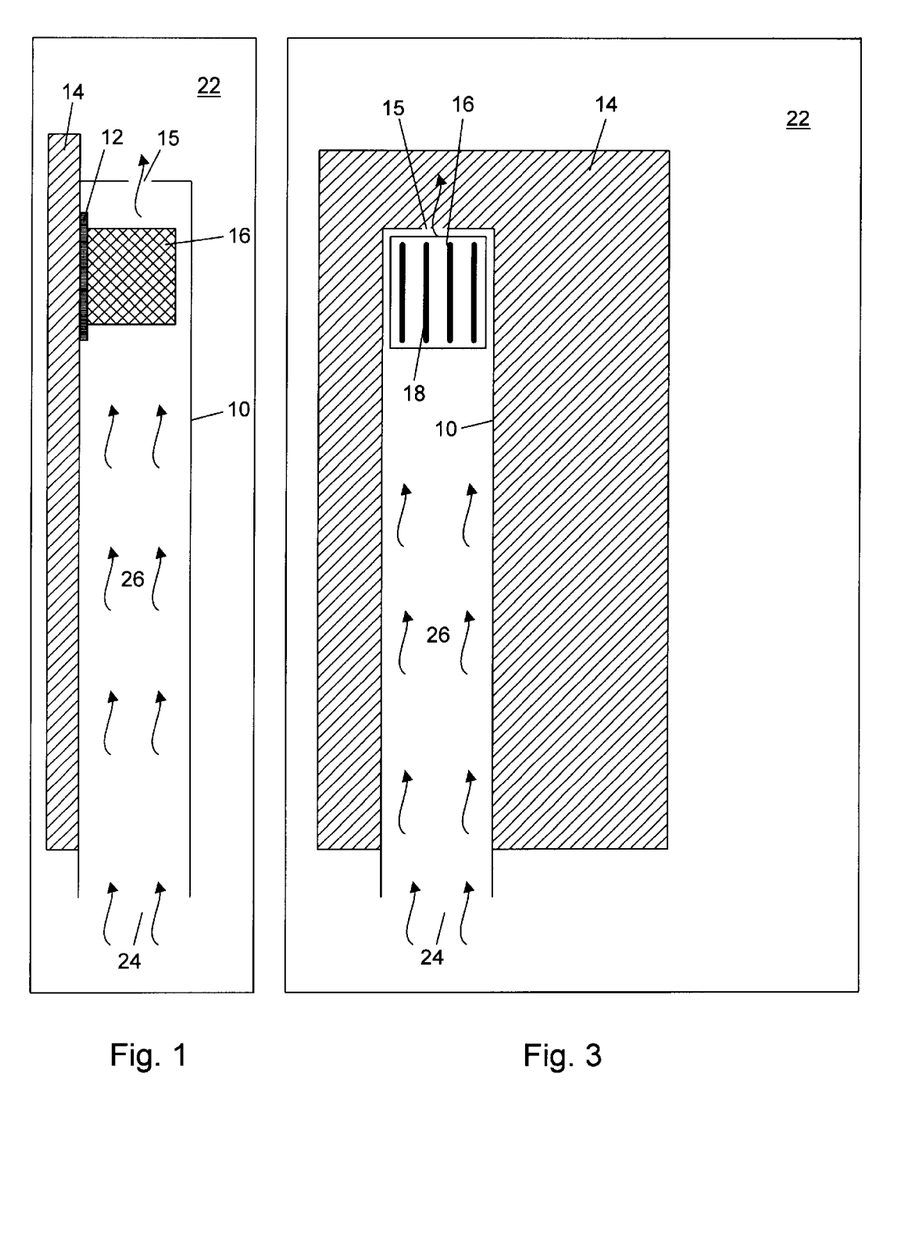
FIG. 1 is a cross-sectional view from a rear of a computer system, wherein an air duct surrounds an integrated circuit and a heat sink, such that cooling air is transferred from a bottom of the computer system to the integrated circuit and the heat sink.
FIG. 3 is a cross-sectional view from a side of a computer system, wherein an air duct surrounds an integrated circuit and a heat sink, such that cooling air is transferred from a bottom of the computer system to the integrated circuit and the heat sink.
Figure 2:
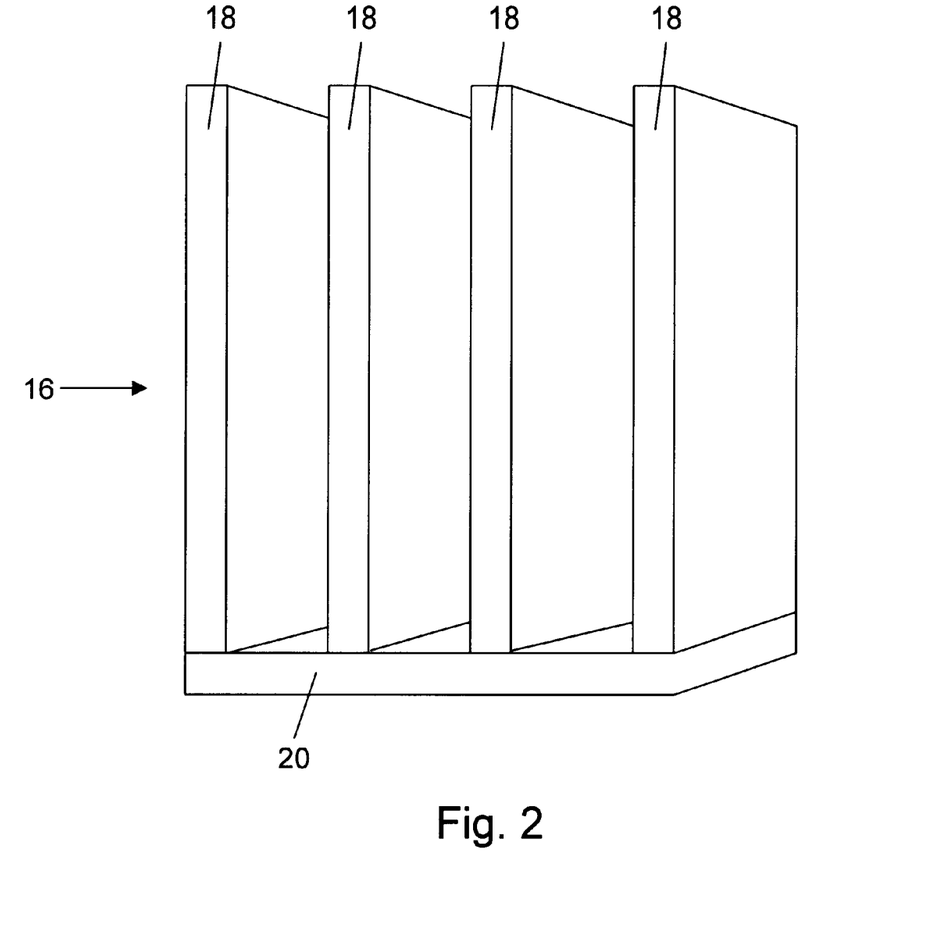
FIG. 2 is a perspective view of a heat sink.

An embodiment of a substantially hollow duct 10 for cooling an integrated circuit 12 mounted on a circuit board 14 is depicted in FIG. 1. A heat sink 16 may be attached to the outer surface of the integrated circuit 12. The heat sink 16 preferably helps transfer the heat generated by the integrated circuit 12 to the surroundings. The use of a variety of heat sinks has been shown in the prior art cited. A heat sink 16, which may be useful in the present invention, is depicted in FIG. 2. The heat sink preferably includes an array of fins 18 extending out from the base 20. The heat sink 16 is thermally conductive to allow transfer from the base 20 to thermally conductive surfaces of fins 18. The fins 18 provide an increased surface area by which the heat may be rapidly dissipated to the surroundings. The fins 18 are preferably aligned parallel to the direction of the air flowing through the duct 10.

Referring back to FIG. 1, duct 10 is preferably substantially hollow and made of a substantially flexible plastic material. The plastic duct 10 may act as a thermal insulator, which isolates the heat produced by an integrated circuit 12 from other components on the circuit board 14. An integrated circuit 12 may be surrounded within a duct 10 such that a portion of the heated air produced by the integrated circuit is contained by the duct. The duct 10 is preferably made from plastic materials which may be relatively good thermal insulators.

Duct 10 is positioned such that the duct substantially surrounds the heat sink 16 and the integrated circuit 12. The duct 10 inner cross section may be any number of shapes including, but not limited to square, round or oval. Duct 10 may be straight or curved depending on the location of other components with the computer interior 22. The duct 10 is preferably contained within an interior 22 of a computer case or chassis, and includes an opening 24, positioned at an end of the duct 10, communicating with the computer interior 22. The duct 10 may be positioned such that the opening 24 is located at a position below the location of the integrated circuit 12. Preferably the opening 24 is positioned proximate the bottom of the computer interior 22. By positioning the duct 10 in this orientation the cooler air 26 at the bottom of the computer interior 22 may be convectively transferred to the integrated circuit 12 and heat sink 16. Another opening 15 may be present to allow the heated air to rise out of the duct 10. Additionally, the duct 10 may serve as a thermal insulator, preventing the heat sink 16 and integrated circuit 12 from heating the components in the vicinity of the integrated circuit. The fins 18 on the heat sink 16, depicted in FIG. 3, are preferably oriented parallel to the direction of the convection current 26. This orientation preferably allows all of the fins 18 to be exposed to the cooler air 26.

Figure 4:
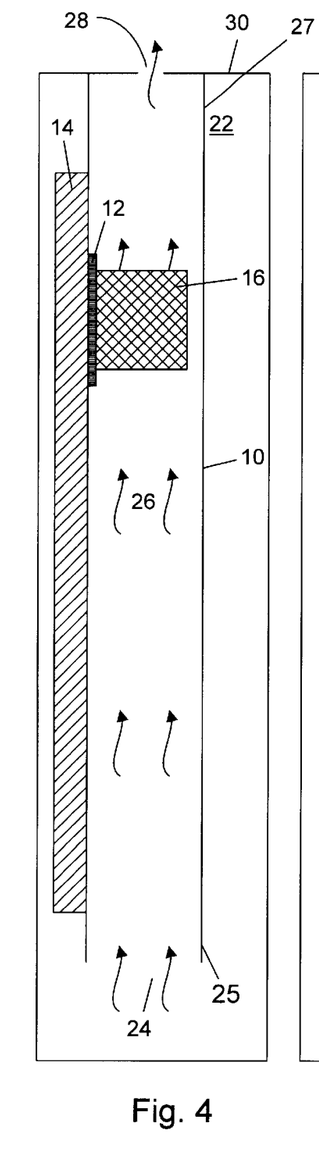
FIG. 4 is a cross-sectional view from a rear of a computer system, wherein an air duct surrounds an integrated circuit and a heat sink, such that cooling air is transferred from a bottom of the computer system, through the heat sink, and out a top of the computer.

In another embodiment, depicted in FIG. 4, a duct 10, having the properties described in the previous embodiment, may be positioned such that the duct 10 substantially surrounds the heat sink 16 and the integrated circuit 12. The duct 10 may be straight or curved depending on the location of other components within the computer interior 22. The duct 10 includes two openings 24 and 28 positioned at opposite ends 25 and 27 of the duct. The first end 25 of the duct is preferably contained within the computer interior 22 having the opening 24. The duct 10 may be positioned such that the opening 24 is located at a position below the location of the integrated circuit 12. Preferably the opening 24 is positioned at the first end 25 of the duct 10, proximate the bottom of the computer interior 22. The second end 27 of the duct 10 may extend through a wall 30 of the computer case. The second end 27 is preferably substantially flush with an outer surface of the wall 30. A screen may be placed over the second end 27 to protect against ingress of foreign material. The second end 27 is preferably located at a position substantially above the location of the integrated circuit 12. Opening 28 preferably communicates with the air outside of the wall 30 of the computer case. The duct 10 may be bent such that the second end 27 passes through the same wall 30 as the first end 25, if desired. Preferably the duct 10 is positioned such that the second opening 28 is formed in the top wall 30 of the computer case.

The duct 10 may act as a thermal insulator, preventing the heat of the integrated circuit 12 from heating the computer interior 22. Additionally, by having the duct 10 open to the air that surrounds the computer case, a cooling air current 26 may flow from the bottom of the case, across the heat sink 16 and the integrated circuit 12, and out the second opening 28 of the duct. The heat produced by the integrated circuit 12, may convectively rise out of the computer case and through the second opening 28. The computer interior 22 temperature may be lowered by isolating the heat generated by the integrated circuit 12 from the other components through the use of a duct. Additionally, by convectively removing the heat from the computer interior 22, the heat of the computer interior may be lowered. The fins 18 of the heat sink 16 are preferably oriented parallel to the direction of the convection current 26.

Figure 5:
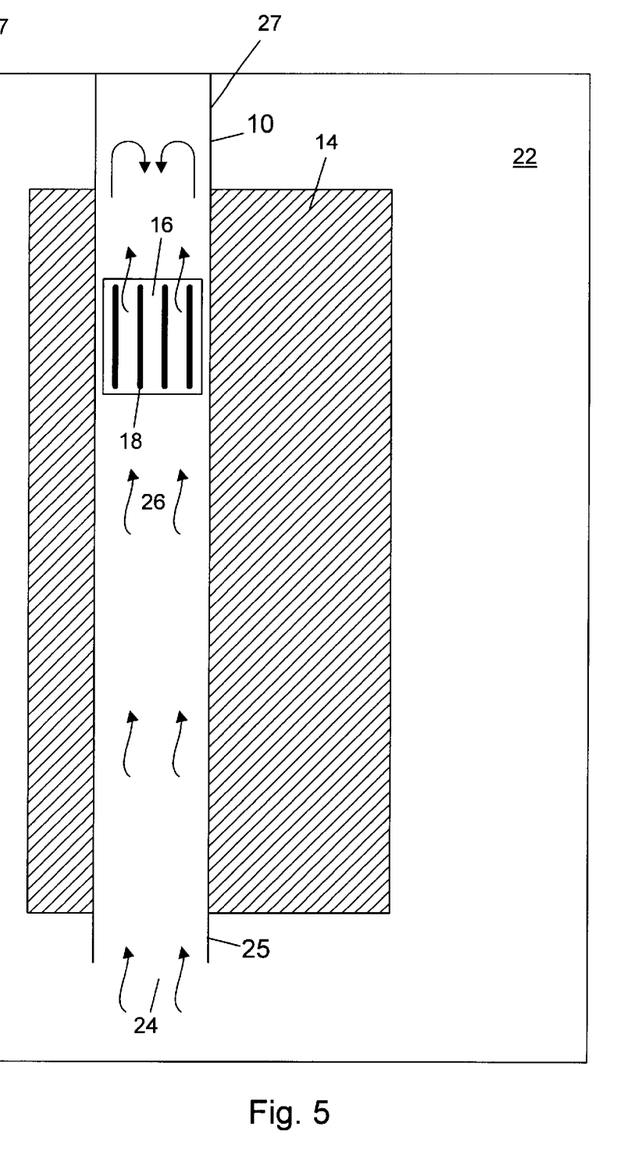
FIG. 5 is a cross-sectional view from the side of a computer system, wherein an air duct surrounds an integrated circuit and a heat sink, such that cooling air is transferred from a bottom of the computer system, through the heat sink, and out a top of the computer.

FIG. 5 depicts a side view of another embodiment, similar to the duct shown in FIG. 4. The duct 10 may be positioned such that the duct substantially surrounds the heat sink 16 and the integrated circuit 12. The duct 10 includes an opening 24 positioned at a first end 25 of the duct. The first end 25 of the duct is preferably contained within the computer interior 22 having the opening 24. The duct 10 may be positioned such that the opening 24 is located at a position below the location of the integrated circuit 12. Preferably the opening 24 is positioned at the first end 25 of the duct 10, proximate the bottom of the computer interior 22. The second end 27 is preferably located at a position substantially above the location of the integrated circuit 12. The duct 10 may act as a thermal insulator, preventing the heat of the integrated circuit 12 from heating the computer interior 22. A cooling air current 26 may flow from the bottom of the case, across the heat sink 16 and the integrated circuit 12, and up into the second end 27 of the duct 10. The heat produced by the integrated circuit 12, may thus convectively above the integrated circuit, allowing the temperature of the integrated circuit to be lowered. The computer interior 22 temperature may be lowered by isolating the heat generated by the integrated circuit 12 from the other components through the use of a duct.

Figure 6:
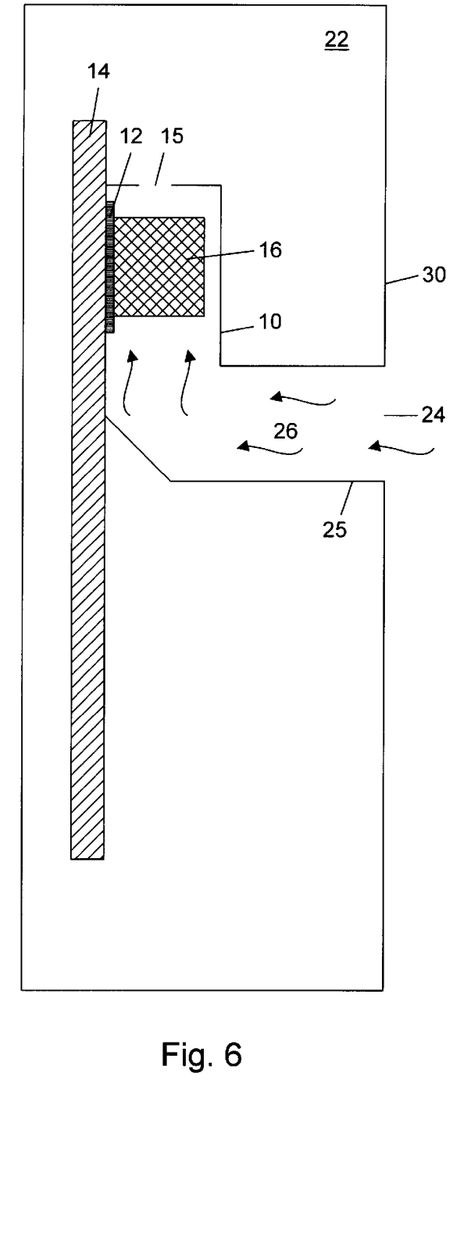
FIG. 6 is a cross sectional view from the rear of a computer system, wherein an air duct surrounds an integrated circuit and a heat sink, such that cooling air is transferred from outside of the computer system to the integrated circuit and the heat sink.

In another embodiment, depicted in FIG. 6, a duct 10, as described in the previous embodiments, may draw cooling air 26 from outside the computer case to cool the integrated circuit 12. The duct 10 has an opening 24 positioned at an end of the duct. The duct 10 is preferably positioned such that an opening 24 is located at a position below the location of the integrated circuit 12. The end 25 of the duct 10 may extend through a wall 30 of the computer case. The end 25 is preferably substantially flush with an outer surface of the wall 30. By positioning the duct 10 in this orientation, the cooler air 26 outside of the computer case may be convectively transferred to the integrated circuit 12 and heat sink 16. Additionally, the duct 10 may serve as a thermal insulator, preventing the heat sink 16 and integrated circuit 12 from heating the components in the vicinity of the integrated circuit.

Figure 7:
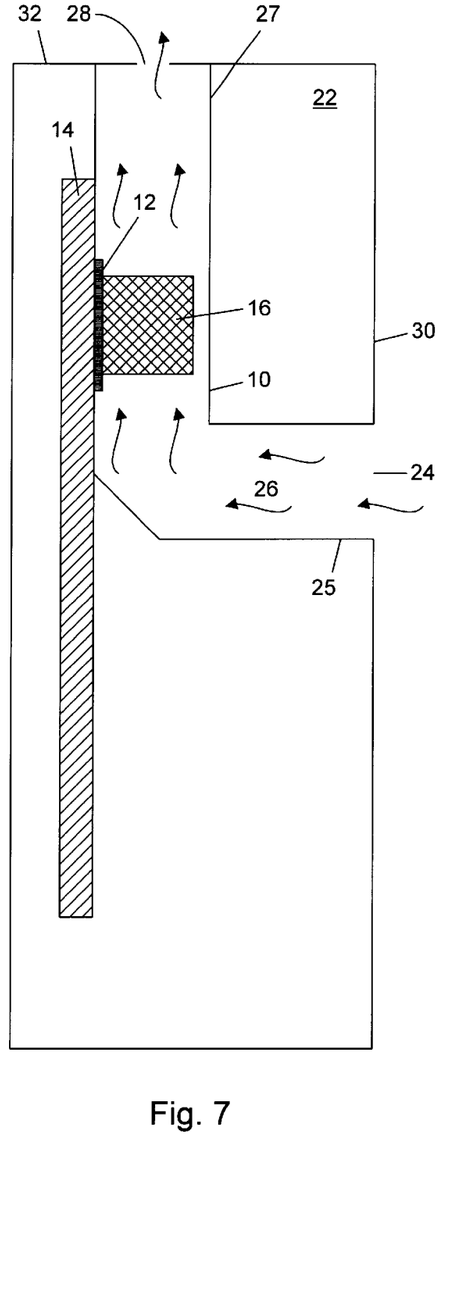
FIG. 7 is a cross sectional view from the rear of a computer system, wherein an air duct surrounds an integrated circuit and a heat sink, such that cooling air is transferred from outside of the computer system, through the heat sink, and out a top of the computer

In another embodiment, depicted in FIG. 7, a plastic duct 10 is positioned such that the duct 10 substantially surrounds the heat sink 16 and the integrated circuit 12. The duct 10 includes two openings 24 and 28 positioned at opposite ends 25 and 27 of the duct. The duct 10 is preferably positioned such that first end 25 is located at a position below the location of the integrated circuit 12. The end 25 of the duct 10 may extend through a wall 30 of the computer case. The end 25 is preferably substantially flush with an outer surface of the wall 30. The second end 27 of the duct 10 may extend through a wall 32 of the computer case. The second end 27 is preferably substantially flush with an outer surface of the wall 32. The second end 27 is preferably located at a position substantially above the location of the integrated circuit 12. Opening 28 preferably communicates with the air outside of the wall 32 of the computer case. The duct may be bent such that the second end 27 passes through the same wall 30 as the first end 25 (not shown). Preferably the duct 10 is positioned such that the second end 27 extends through the top wall 32 of the computer case. The air may then be convectively transferred from the first opening 24 past the heat sink 16 and integrated circuit 12 and out the second opening 28. The use of two "external" openings may allow a more efficient transfer of cooling air across the integrated circuit 12 and the heat sink 16.

The duct systems depicted in FIG. 6 and FIG. 7 offer significant advantages over the previous embodiments. One advantage is that the integrated circuit may be thermally isolated from the computer interior 22. Since the duct 10 completely surrounds the integrated circuit 12 the integrated circuit may be thermally isolated from the computer interior. The duct systems continuously draw cooling air 26 from the surroundings, rather than from the interior of the computer case 22, allowing for a more efficient cooling of the integrated circuit 12.

Cooling efficiency of an integrated circuit located within a duct may be improved by the use of cooling fans. Cooling fans may be placed at a variety of positions within the interior and upon the exterior of the duct. Additionally fans may be placed on the heat sink or the integrated circuit. Fans may be used to increase the velocity of the cooling air traveling through the ducts, thereby increasing the rate of cooling and lowering the average temperature of an integrated circuit.

When a fan is used to help convey the cooling air, the duct serves a number of purposes. The duct may help direct the air into the appropriate regions of the computer. Additionally, the duct may help dampen the acoustical and mechanical vibrations caused by the fan. Fans are believed to produce both acoustical vibrations, e.g. noise, and mechanical vibrations. These vibrations may have a damaging effect on the integrated circuit. It is known that such vibrations may cause the contacts between the integrated circuit and the motherboard to loosen. The duct, therefore, is preferably made from a pliable, acoustical dampening plastic material to minimize the acoustical vibrations transferred to the integrated circuit from one or more fans. The plastic duct may absorb some of these vibrations, thus limiting the intensity of the vibrations which reach the circuit. Additionally, the duct may include noise baffles located in the interior of the duct which may dampen the acoustical vibrations produced by a fan.

Figure 8:
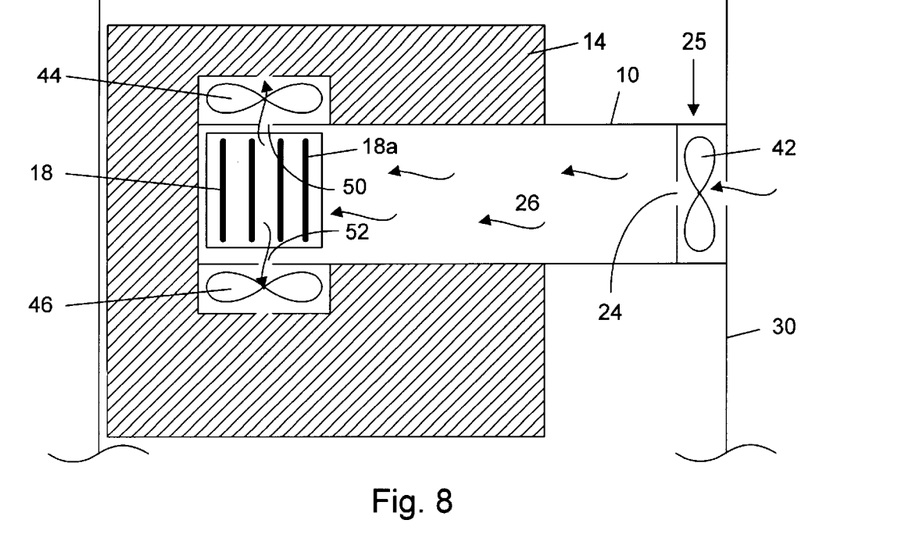
FIG. 8 is a partial cross sectional view from the side of a computer system, wherein an air duct with three fans surrounds an integrated circuit and a heat sink such that cooling air is transferred from outside of the computer system, through the heat sink and outside the air duct by the cooling fans.

FIG. 8 depicts an embodiment in which three fans 42, 44, and 46 are used in conjunction with a duct 10 to cool an integrated circuit 12. The duct 10 has an opening 24 positioned at an end 25 of the duct. The duct 10 is preferably positioned such that an opening 24 is located at a position above the location of the integrated circuit 12. The end 25 of the duct 10 may extend through a wall 30 of the computer case. The end 25 is preferably substantially flush with an outer surface of the wall 30. The duct may include additional openings 50 and 52 next to the heat sink 16 to allow cooling air 26 to flow through the heat sink 16 and out of the duct 10.

A first fan 42 is preferably positioned within the duct 10. The fan is preferably positioned proximate the end 25 of the duct. The fan 42 is preferably positioned such that the fan draws cooling air 26 into the duct 10 from outside the computer case. The cooling air 26 flows through the duct 10 across the heat sink 16 and the integrated circuit 12, and out of the duct into the computer interior 22 through the openings 50 and 52. The fans 44 and 46 may be present to assist the flow of cooling air 26 through the duct 10. Preferably both fans 44 and 46 are present. Fans 44 and 46 are preferably located on opposite sides of the duct 10, communicating with openings 50 and 52. In this manner a steady flow of cooling air 26 may be continuously passed over the heat sink 16 and the integrated circuit 12.

Figure 9:
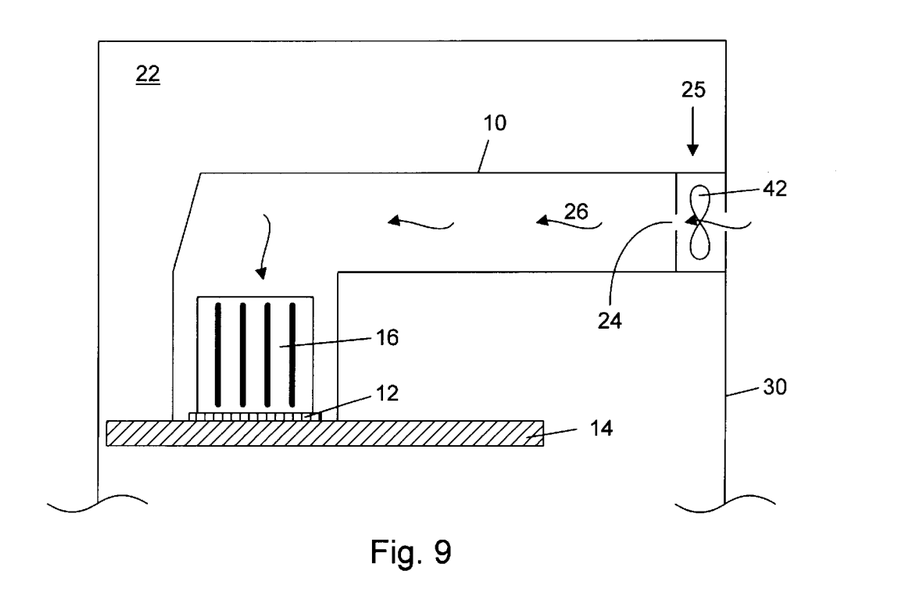
FIG. 9 is a partial cross sectional view from the bottom of a computer system, wherein an air duct with three fans surrounds an integrated circuit and a heat sink such that cooling air is transferred from outside of the computer system, through the heat sink and outside the air duct by the cooling fans.

Referring to FIG. 9, the air duct 10 as described above, is depicted from the side. Fans 44 and 46 are present, but are not shown. The duct 10 is preferably bent such that the air enters the region of the heat sink 16 at a location substantially above the heat sink 16. This allows the cooling air 26 to pass over all of the fins 18 of the heat sink before being pulled past the heat sink. If the duct were not bent in this manner, the majority of the cooling air would hit the front fin 18a, depicted in FIG. 8, and would not be evenly distributed among the other fins. The use of an angled duct, as depicted in FIG. 9 may have the advantage of creating a laminar air flow over the heat sink 16 and the integrated circuit 12.

Figure 10:
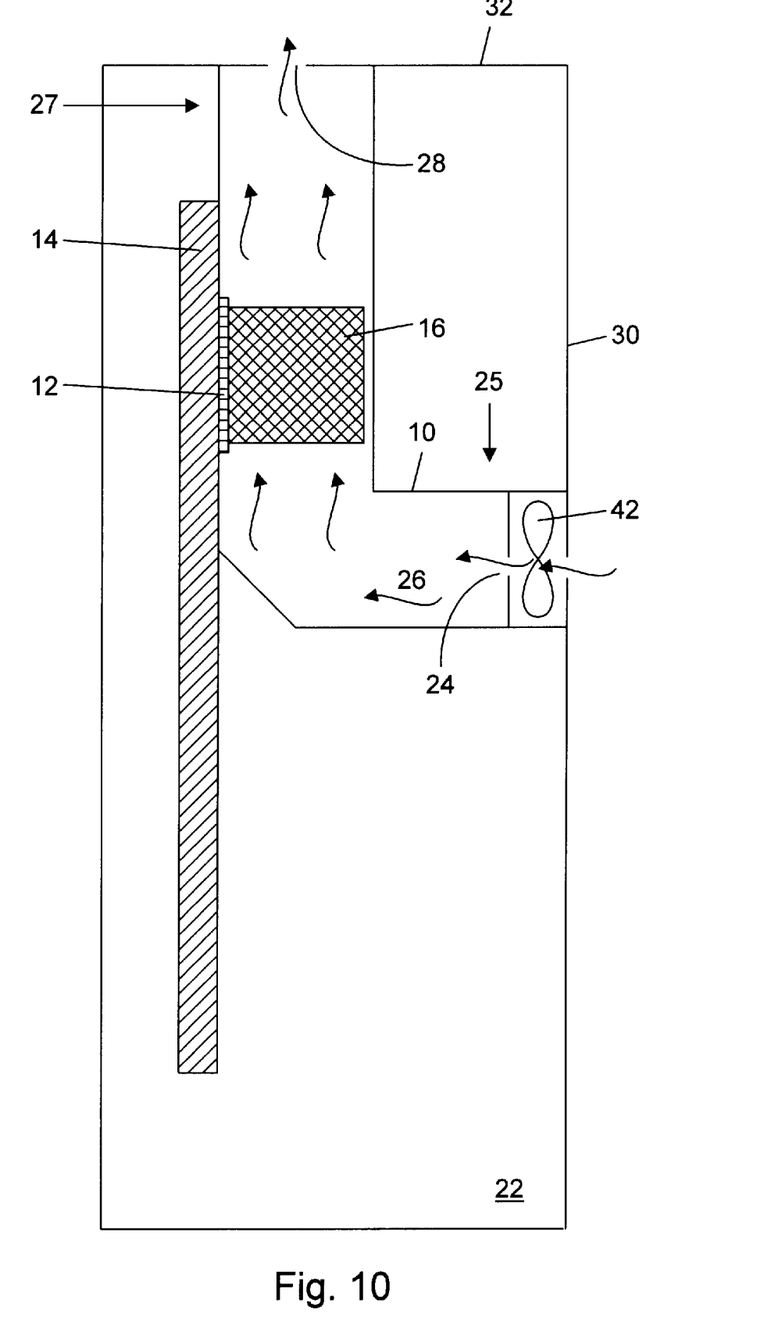
FIG. 10 is a partial cross sectional view from the rear of a computer system, wherein an air duct with a fan surrounds an integrated circuit and a heat sink such that cooling air is transferred from outside of the computer system, through the heat sink and out the top of the computer system by the fan.

In another embodiment, depicted in FIG. 10, a plastic duct 10 is positioned such that the duct 10 substantially surrounds the heat sink 16 and the integrated circuit 12. The duct 10 includes two openings 24 and 28 positioned at opposite ends 25 and 27 of the duct. The duct 10 is preferably positioned such that first end 25 is located at a position below the location of the integrated circuit 12. The end 25 of the duct 10 may extend through a wall 30 of the computer case. The end 25 is preferably substantially flush with an outer surface of the wall 30. The second end 27 of the duct 10 may extend through a wall 32 of the computer case. The second end 27 is preferably substantially flush with an outer surface of the wall 32. The second end 27 is preferably located at a position substantially above the location of the integrated circuit 12. Opening 28 preferably communicates with the air outside of the wall 32 of the computer case. Preferably the duct 10 is positioned such that the second end 27 extends through the top wall 32 of the computer case. The fan 42 is preferably positioned such that the fan draws cooling air 26 into the duct 10 from outside the computer case. The cooling air 26 flows through the duct 10 across the heat sink 16 and integrated 12, and out of the computer case through the opening 28.

Figure 11:
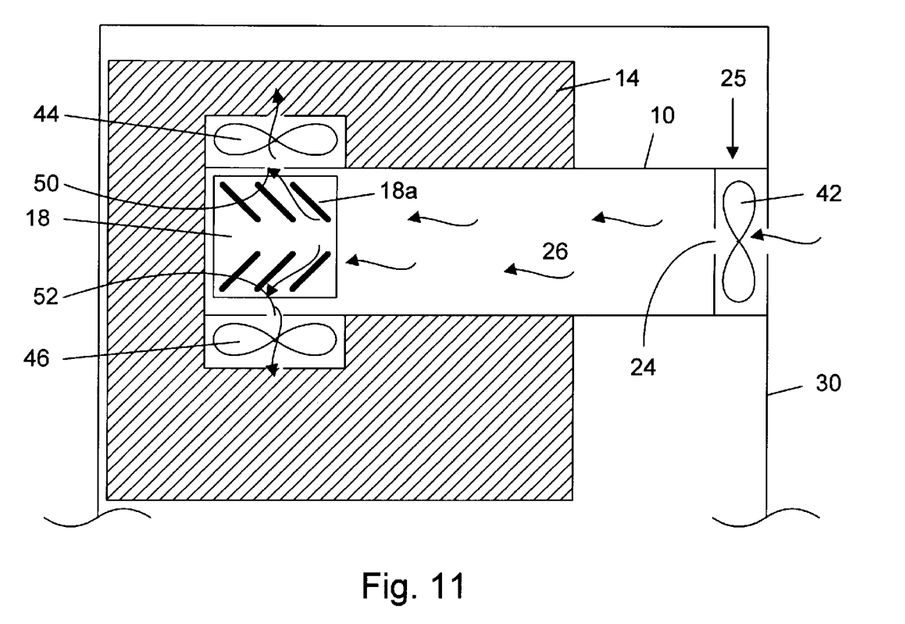
FIG. 11 is a partial cross sectional view from the side of a computer system, wherein an air duct with three fans surrounds an integrated circuit and a heat sink with slanted fins such that cooling air is transferred from outside of the computer system, through the heat sink and outside the air duct by the cooling fans.

FIG. 11 depicts an embodiment in which three fans 42, 44, and 46 are used in conjunction with a duct 10 to cool an integrated circuit 12. The duct 10 has an opening 24 positioned at an end 25 of the duct. The end 25 of the duct 10 may extend through a wall 30 of the computer case such that end 25 is substantially flush with an outer surface of the wall 30. The duct may include additional openings 50 and 52 next to the heat sink 16 to allow cooling air 26 to flow through the heat sink 16 and out of the duct 10. A first fan 42 is preferably positioned within the duct 10. The fan is preferably positioned proximate the end 25 of the duct 10. The fan 42 is preferably positioned such that the fan draws cooling air 26 into the duct 10 from outside the computer case. The cooling air 26 flows through the duct 10 across the heat sink 16 and the integrated circuit 12, and out of the duct into the computer interior through the openings 50 and 52. The fans 44 and 46 may be present to assist the flow of cooling air 26 through the duct 10. Preferably both fans 44 and 46 are present. Fans 44 and 46 are preferably located on opposite sides of the duct 10, communicating with openings 50 and 52.

In this manner a steady flow of cooling air 26 may be continuously passed over the heat sink 16 and the integrated circuit 12 The heat sink 16 includes a number of angled fins 18. The angled fins 18 allow better transfer of the cool air throughout heat sink 16. The use of angled fins 18 allows the duct to be substantially linear. The front fins 18a allow cooling air to pass to the other fins and out the openings 50 and 52.

Figure 12:
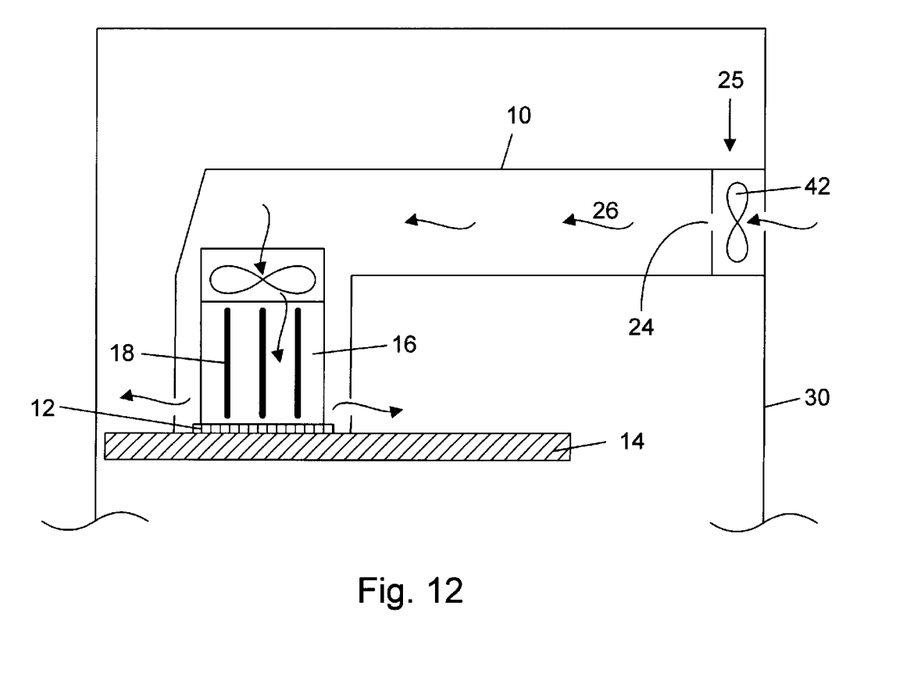
FIG. 12 is a partial cross sectional view from the bottom of a computer system, wherein an air duct with two fans surrounds an integrated circuit and a heat sink such that cooling air is transferred from outside of the computer system, through the heat sink and onto the integrated circuit by the cooling fans.

FIG. 12 depicts an embodiment in which two fans 42 and 60 are used in conjunction with a duct 10 to cool an integrated circuit 12. The duct 10 may form an air tight seal around the integrated circuit 12. The duct 10 has an opening 24 positioned at an end 25 of the duct. The duct 10 is preferably positioned such that an opening 24 is located at a position above the location of the integrated circuit 12. The end 25 of the duct 10 may extend through a wall 30 of the computer case. The end 25 is preferably substantially flush with an outer surface of the wall 30. A first fan 42 is preferably positioned within the duct 10. The fan is preferably positioned proximate the end 25 of the duct. The fan 42 is preferably positioned such that the fan draws cooling air 26 into the duct 10 from outside the computer case. The cooling air 26 flows through the duct 10 across the heat sink 16 and the integrated circuit 12. The fan 60 may be present to assist the flow of cooling air 26 through the duct 10. Preferably fan 60 is position above the heat sink 16. Fan 60 may be coupled to heat sink 16. In this manner a steady flow of cooling air 26 may be continuously blown onto the heat sink 16 and the integrated circuit 12. The duct 10 is preferably bent such that the air enters the region of the heat sink 16 at a location substantially above the heat sink 16. This allows the cooling air 26 to pass over all of the fins 18 of the heat sink before being pulled past the heat sink. The use of an angled duct 10 may have the advantage of creating a laminar air flow over the heat sink 16 and the integrated circuit 12.

Figure 13:
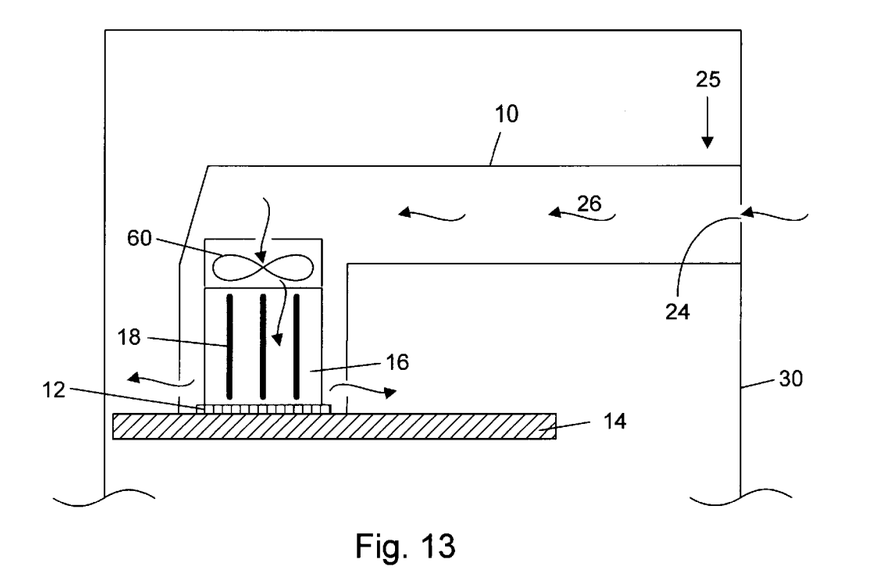
FIG. 13 is a partial cross sectional view from the bottom of a computer system, wherein an air duct with a fan surrounds an integrated circuit and a heat sink such that cooling air is transferred from outside of the computer system, through the heat sink and onto the integrated circuit by the cooling fan.

FIG. 13 depicts an embodiment in which a fan 60 is used in conjunction with a duct 10 to cool an integrated circuit 12. The duct 10 has an opening 24 positioned at an end 25 of the duct. The duct 10 is preferably positioned such that an opening 24 is located at a position above the location of the integrated circuit 12. The end 25 of the duct 10 may extend through a wall 30 of the computer case. The end 25 is preferably substantially flush with an outer surface of the wall 30. Preferably fan 60 is positioned above the heat sink 16. Fan 60 may be coupled to heat sink 16. The fan 60 preferably draws cooling air 26 into the duct 10 from outside the computer case. In this manner a steady flow of cooling air 26 may be continuously blown onto the heat sink 16 and the integrated circuit 12. The duct 10 is preferably bent such that the air enters the region of the heat sink 16 at a location substantially above the heat sink 16. This allows the cooling air 26 to pass over all of the fins 18 of the heat sink before being pulled past the heat sink. The use of an angled duct 10 may have the advantage of creating a laminar air flow over the heat sink 16 and the integrated circuit 12.

Figure 15:
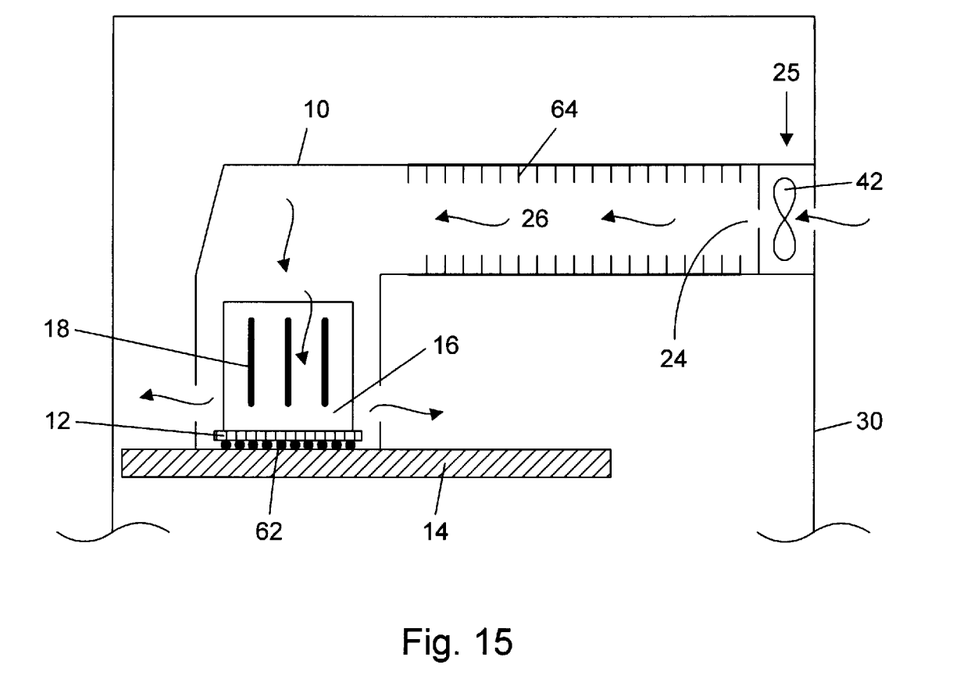
FIG. 15 is a partial cross sectional view from the bottom of a computer system, wherein an air duct with a fan and noise baffles surrounds an integrated circuit and a heat sink such that cooling air is transferred from outside of the computer system, through the heat sink and onto the integrated circuit by the cooling fan.

In another embodiment, depicted in FIG. 15, a fan 42 is preferably used in conjunction with a duct 10 to cool an integrated circuit 12. The duct 10 has an opening 24 positioned at an end 25 of the duct. The duct 10 is preferably positioned such that an opening 24 is located at a position above the location of the integrated circuit 12. The end 25 is preferably substantially flush with an outer surface of the wall 30. The fan 42 preferably draws cooling air into the duct 10 from outside the computer case.

The acoustical and mechanical vibrations caused by the fan are preferably isolated from the integrated circuit. This is particular important when solder ball connections 62 are used. Solder balls 62 are particular sensitive to acoustical vibrations and may be readily damaged by these types of vibrations produced by the fan 42. The fan is preferably distally located from the integrated circuit to minimize these vibrations. In addition, the duct preferably includes noise baffles 64 running along the interior surface of the duct. The combination of noise baffles and a duct made of acoustical noise absorbing material together may lessen the acoustical vibrations reaching the integrated circuit 12.

Figure 14:
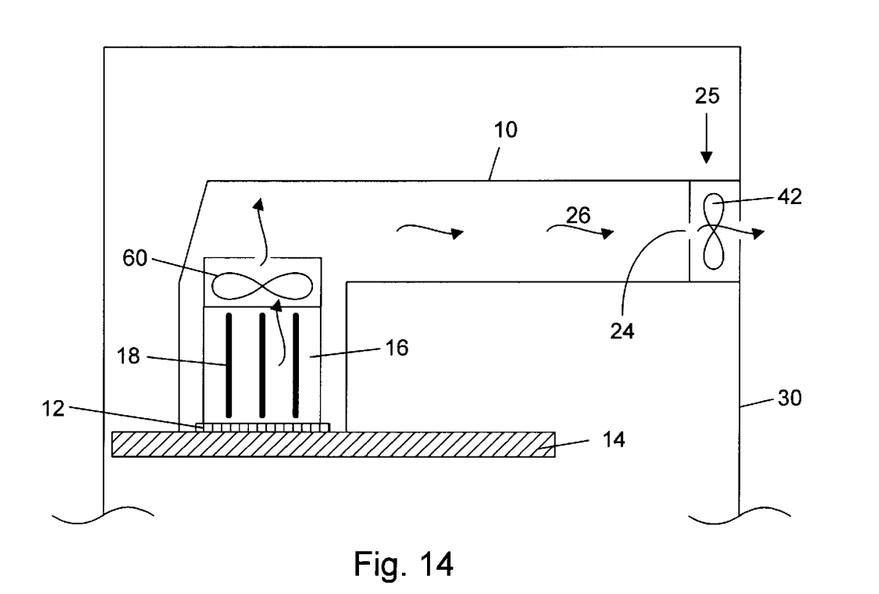
FIG. 14 is a partial cross sectional view from the bottom of a computer system, wherein an air duct with two fans surrounds an integrated circuit and a heat sink such that heated air produced by the integrated circuit is transferred to the outside of the computer system by the cooling fans.

It should be recognized that the fans used in the above described embodiments may be used to force air out of the duct rather than into the duct. Referring to FIG. 14, an embodiment in which two fans 42 and 60 are used to remove heat from an integrated circuit 12 through a duct 10 is depicted. The duct 10 has an opening 24 positioned at an end 25 of the duct. The end 25 of the duct 10 may extend through a wall 30 of the computer case. The end 25 is preferably substantially flush with an outer surface of the wall 30. A first fan 42 is preferably positioned within the duct 10. The fan is preferably positioned proximate the end 25 of the duct. The fan 42 is preferably positioned such that the fan draws heated air 26 through the duct 10 and out of the computer case. The fan 60 may be present to assist the flow of heated air 26 through the duct 10. Preferably fan 60 is positioned above the heat sink 16. Fan 60 may be coupled to heat sink 16. The heated air is produced by the heat generated by the integrated circuit 12 and transferred to the heat sink 16. By drawing the heated air out of the duct the integrated circuit may be cooled. It should be noted that a reversal of air current flow may be used in any of the previously described embodiments using a fan.

It will be appreciated to those skilled in the art having the benefit of this disclosure that this invention is believed to be capable of lowering the temperature of integrated circuits and the interior of the computer casing by the use of air cooling ducts alone or in combination with cooling fans. Furthermore, it is also to be understood that the form of the invention shown and described is to be taken as presently preferred embodiments. Various modifications and changes may be made without departing from the spirit and scope of the invention as set forth in the claims. Specifically the addition or deletion of fans to any of the embodiments may be undertaken while still achieving the desired results. It is intended that the following claims be interpreted to embrace all such modifications and changes.

What is claimed is:

1. A system for cooling integrated circuits within an enclosure, comprising:

a duct which substantially surrounds an integrated circuit, the duct defining at least one opening; wherein the duct is a flexible plastic insulated duct, and wherein the insulated duct minimizes heat transfer between the duct and the enclosure; and a fan contained within the duct;

wherein the duct extends into a region of cooling air, the cooling air temperature being substantially less than the integrated circuit temperature, and wherein air within the duct flows such that the temperature of the integrated circuit is cooled, and wherein a noise baffle is disposed within the duct to reduce acoustic vibrations caused by the fan.

2. The system of claim 1, further comprising a heat sink coupled to the integrated circuit.

3. The system of claim 1 wherein the opening is positioned proximate an end of the duct, and wherein the opening communicates with air inside a computer case.

4. The system of claim 1 wherein the opening is positioned proximate an end of the duct, and wherein the opening communicates with air outside a computer case.

5. The system of claim 1 wherein the duct defines a first opening and a second opening, the first opening positioned proximate a first end, the second opening positioned proximate a second end, and wherein the first opening communicates with air inside a computer case, and wherein a second opening communicates with air outside the computer case.

6. The system of claim 1 wherein the fan is contained within the duct.

7. The system of claim 1 wherein the fan is contained within the duct proximate the opening.

8. The system of claim 1 wherein the fan conducts air from the region of cooling air into the duct.

9. The system of claim 1 wherein the duct is a substantially angled duct, wherein the angled duct is adapted to create a laminar air flow.

10. The system of claim 1, wherein the duct substantially reduces transmission of the vibration of the fan to the integrated circuit.

11. The system of claim 1 wherein the duct substantially reduces the acoustic noise of the fan.

* * * * *